(12) United States Patent
Kowalchuk

(10) Patent No.: US 9,232,690 B2
(45) Date of Patent: Jan. 12, 2016

(54) AIRCART WITH INTEGRATED FERTILIZER BLENDING

(71) Applicant: CNH Canada, Ltd., Saskatoon (CA)

(72) Inventor: Trevor Kowalchuk, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 10 days.

(21) Appl. No.: 13/675,358

(22) Filed: Nov. 13, 2012

(65) Prior Publication Data

US 2014/0131485 A1 May 15, 2014

(51) Int. Cl.
| | |
|---|---|
| *G06F 17/00* | (2006.01) |
| *A01C 21/00* | (2006.01) |
| *A01C 7/06* | (2006.01) |
| *A01C 7/08* | (2006.01) |

(52) U.S. Cl.
CPC . *A01C 21/00* (2013.01); *A01C 7/06* (2013.01); *A01C 7/081* (2013.01); *G06F 17/00* (2013.01)

(58) Field of Classification Search
CPC .......................................... A01C 21/00
USPC ...................... 701/2, 36, 45, 47, 50; 111/100; 116/120; 132/131; 133/131
See application file for complete search history.

(56) References Cited

U.S. PATENT DOCUMENTS

| | | | | | |
|---|---|---|---|---|---|
| 5,240,324 | A | * | 8/1993 | Phillips ................... | B01F 5/265 222/55 |
| RE35,100 | E | * | 11/1995 | Monson ............... | A01B 79/005 111/130 |
| 5,961,040 | A | * | 10/1999 | Traylor ................. | E01C 19/201 239/1 |
| 6,040,539 | A | * | 3/2000 | Hiegel .................... | G06F 3/039 200/302.1 |
| 6,070,539 | A | * | 6/2000 | Flamme ............... | A01B 79/005 111/177 |
| 6,285,938 | B1 | | 9/2001 | Lang et al. | |
| 6,854,405 | B2 | | 2/2005 | Memory | |
| 7,500,814 | B2 | | 3/2009 | Meyer | |
| 7,669,538 | B2 | | 3/2010 | Memory et al. | |
| 2007/0034721 | A1 | * | 2/2007 | Owenby ................ | A01C 7/122 239/656 |
| 2009/0271136 | A1 | | 10/2009 | Beaujot et al. | |
| 2011/0056308 | A1 | | 3/2011 | Henry et al. | |
| 2013/0008361 | A1 | * | 1/2013 | Trevino ................ | A01B 79/005 111/120 |

OTHER PUBLICATIONS

FLEXI-COIL 2—Flexi-Coil launches new onboard computer and enhanced safety features; Posted on Feb. 24, 2012; FLEXI-COIL; Published on Nov. 18, 2011—(2 Pages).
FLEXI-COIL-5500 Air Drill a Breath of Fresh Air for West Aussie Grower; Posted on Feb. 27, 2012; FLEXI-COIL; Published on Nov. 17, 2011—(2 Pages).

* cited by examiner

*Primary Examiner* — Thomas G Black
*Assistant Examiner* — Ana Thomas
(74) *Attorney, Agent, or Firm* — Rebecca L. Henkel

(57) ABSTRACT

A method and system for controlling an air cart to deliver custom blends of fertilizer to a field is disclosed. A farmer purchases base nutrients which are mixed together during delivery to the field. An air cart having multiple compartments is selected according to the number of base nutrients and/or seed to be delivered. Metering units associated with each compartment control the rate at which product is delivered. An operator defines a desired blend of fertilizer and identifies each of the base nutrients loaded into the air cart. The controller generates control signals output to each metering unit to control the rate at which product is delivered according to the desired blend of fertilizer. Thus, a farmer may purchase and store base nutrients rather than various blends of fertilizer and create multiple customized blends as needed according to the area and the type of seed to be planted.

18 Claims, 7 Drawing Sheets

AIRCART WITH INTEGRATED FERTILIZER BLENDING

BACKGROUND OF THE INVENTION

The subject matter disclosed herein relates generally to agricultural implements and, in particular, to an air cart having multiple compartments from which different components of fertilizer may be distributed at separately controlled distribution rates to achieve a customized blend of fertilizer.

Air carts are commonly towed by tractors to apply seed, fertilizer, or micro-nutrients or any granular product to a field. The air cart includes a hopper having one or more compartments configured for holding product, generally seed or fertilizer. Air carts also generally include a volumetric metering system operable to measure a fixed volume of product per unit of linear distance from each tank and a pneumatic distribution system for delivering the product from the tank to the soil. A tilling implement may be towed in cooperation with the air cart to first open a row in the field, receive product from the air cart, and subsequently close the row over the distributed product. One or more compartments in the air cart may be filled with seed while one or more compartments may similarly be filled with fertilizer. The air cart controls distribution from each compartment such that one compartment provides seed and another compartment provides fertilizer at the desired rates.

Historically, fertilizer has been manufactured according to certain standard blends of nutrients. A standard blend may be defined in percentages, for example, as 20-10-10, meaning it contains 20 lbs. of nitrogen, 10 lbs. of phosphorous, and 10 lbs. of potassium per 100 lbs. of fertilizer. However, the standard blends may not be ideal for every type of crop or soil. Further, a farmer may want different blends of fertilizer for an initial application of fertilizer versus a subsequent application. Although custom blends of fertilizer may be ordered, customizing the fertilizer blend increases expense. In addition, separate custom blends may be required for each crop the farmer intends to plant. Thus, the farmer must maintain inventory of multiple blends at extra expense. Once delivered, the farmer is also limited in flexibility to select a different crop, for example, should weather conditions permit early planting or require later planting.

SUMMARY OF THE INVENTION

The present invention provides a method and system for controlling an air cart to deliver custom blends of fertilizer to a field. Rather than purchasing a customized blend of fertilizer, the farmer purchases base nutrients and the base nutrients are mixed together during delivery to the field. An air cart having three, four, or even more compartments is selected according to the number of base nutrients and/or seed to be delivered. Metering units at the output of, or mounted within, each compartment control the rate at which product is delivered from each compartment. A controller, on the tractor for example, includes a program which allows an operator to define a desired blend of fertilizer. The user further identifies each of the base nutrients loaded into the air cart. The controller generates control signals output to each metering unit to control the rate at which product is delivered according to the desired blend of fertilizer. Thus, a farmer may purchase and store base nutrients rather than various blends of fertilizer and create multiple customized blends as needed according to the area and the type of seed to be planted. The farmer also has enhanced flexibility to select a particular crop for planting according to any of the weather conditions, soil conditions, or even the conditions of the commercial markets for a particular crop.

According to one embodiment of the invention, a method of distributing a custom blend of fertilizer to a field from an air cart using a controller in a tow vehicle is disclosed. The air cart has a plurality of compartments configured to hold a product for distribution to the field, and the controller includes a memory device, a display, and a user interface. The method includes the steps of providing a first configuration screen on the display to prompt an operator to provide identification of the product contained in each of the plurality of compartments, receiving from the operator identification of the product contained in each of the plurality of compartments via the user interface, and storing the identification of each product in the memory device. The method further includes the steps of providing a second configuration screen on the display to prompt the operator to identify a desired ratio of each of the products to be applied to the field, receiving from the operator the desired ratio of each of the products via the user interface, and storing the desired ratio of each of the products in the memory device. The desired ratio of each of the products defines the custom blend of fertilizer. The controller determines a rate of distribution of each product contained in one of the compartments as a function of the product identified in the compartment and of the desired ratio of each of the products to be applied to the field and generates a signal output from the controller to a metering device for each of the compartments as a function of the rate of distribution of the corresponding product.

According to another aspect of the invention, a visual indication is provided on the display to the operator of the rate of distribution of each of the products. Another visual indication may be provided on the display to the operator identifying which of the compartments will empty first as a function of the desired ratio of each of the products.

According to still another aspect of the invention, the air cart includes a primary run and a secondary run for delivery of product to the field. The second configuration screen further prompts the operator to identify whether each of the products is applied via the primary run or the secondary run. Optionally, the operator may identify the same product in at least two of the compartments on the first configuration screen. The rate of distribution of the product is then determined as a function of each of the compartments in which it is contained.

According to another embodiment of the invention, a method of distributing a custom blend of fertilizer to a field from an air cart having a plurality of compartments is disclosed. Each compartment is configured to hold a product for distribution to the field. The method includes the steps of storing a plurality of identifiers in a memory device of a controller configured to control operation of the air cart, storing a distribution rate for each of the products contained within the air cart, and controlling a metering unit operatively connected to each compartment to distribute the product from the compartment according to the stored distribution rate. Each identifier corresponds to the product contained within one of the plurality of compartments, and the distribution rates define the custom blend of fertilizer to be distributed.

According to another aspect of the invention, the air cart includes a primary run and a secondary run for distributing the product in each of the compartments to the field. The air cart also includes an actuator operatively connected to each compartment to selectively connect either the primary run or the secondary run to the compartment. After storing the distribution rate for each product, the method further includes the steps of storing an indication of either the primary run or the secondary run for to be used by the compartment and controlling an actuator operatively connected to each compartment to selectively connect either the primary run or the secondary run to the compartment.

According to yet another embodiment of the invention, a system for distributing a custom blend of fertilizer to a field includes an air cart having a plurality of compartments configured to hold a product for distribution to the field and a plurality of metering units operatively connected to at least one of the compartments to control the rate at which the product is distributed to the field. The system further includes a controller having a memory device configured to store a plurality of instructions and a plurality of configuration parameters, a user interface configured to receive data from an operator for the configuration parameters, a display for providing a visual indication to a user of at least one of the configuration parameters and operation of the air cart, and a plurality of output signals generated as a function of the configuration parameters. Each output signal controls operation of one of the metering units. The controller further includes a processor configured to execute the stored instructions to receive from the operator via the user interface identification of the product contained in each of the plurality of compartments and a desired ratio of each product to be distributed to the field, store the identification of the product and the desired ratio in the configuration parameters, and generate the output signals as a function of the identification of the product and the desired ratio in the configuration parameters.

Other objects, features, aspects, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE FIGURES

Preferred exemplary embodiments of the invention are illustrated in the accompanying drawings in which like reference numerals represent like parts throughout.

In the drawings.

The drawings furnished herewith illustrate a preferred construction of the present invention in which the above advantages and features are clearly disclosed as well as others which will be readily understood from the following description of the illustrated embodiment.

DETAILED DESCRIPTION

The various features and advantageous details of the subject matter disclosed herein are explained more fully with reference to the non-limiting embodiments described in detail in the following description.

Figure 1:
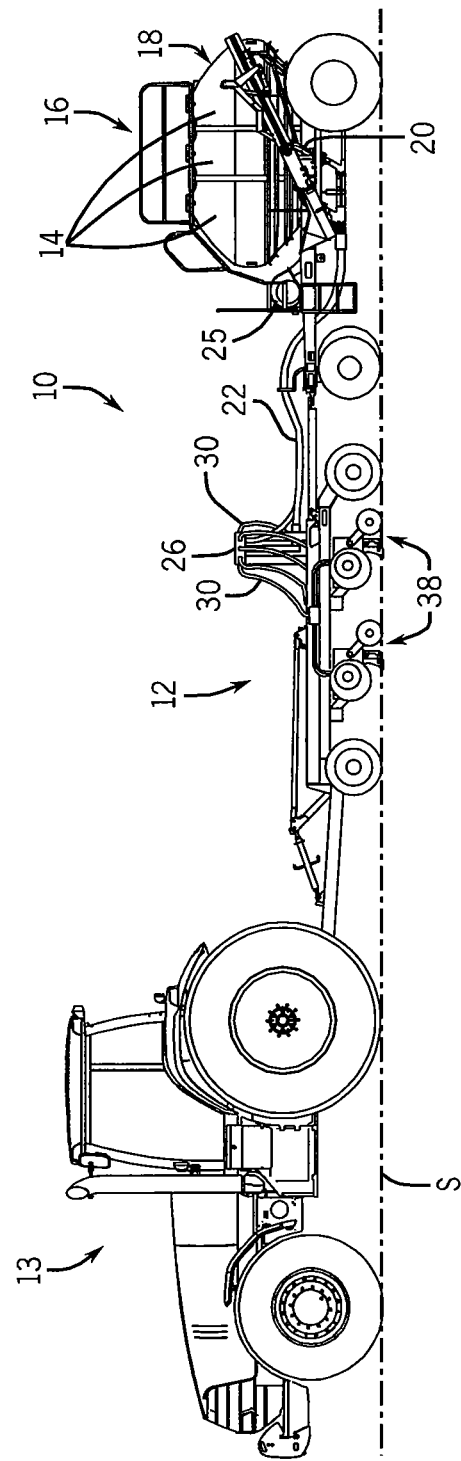
FIG. 1 is an side elevation view of an exemplary tractor, air hoe, and air cart incorporating one embodiment of the present invention.
Figure 2:
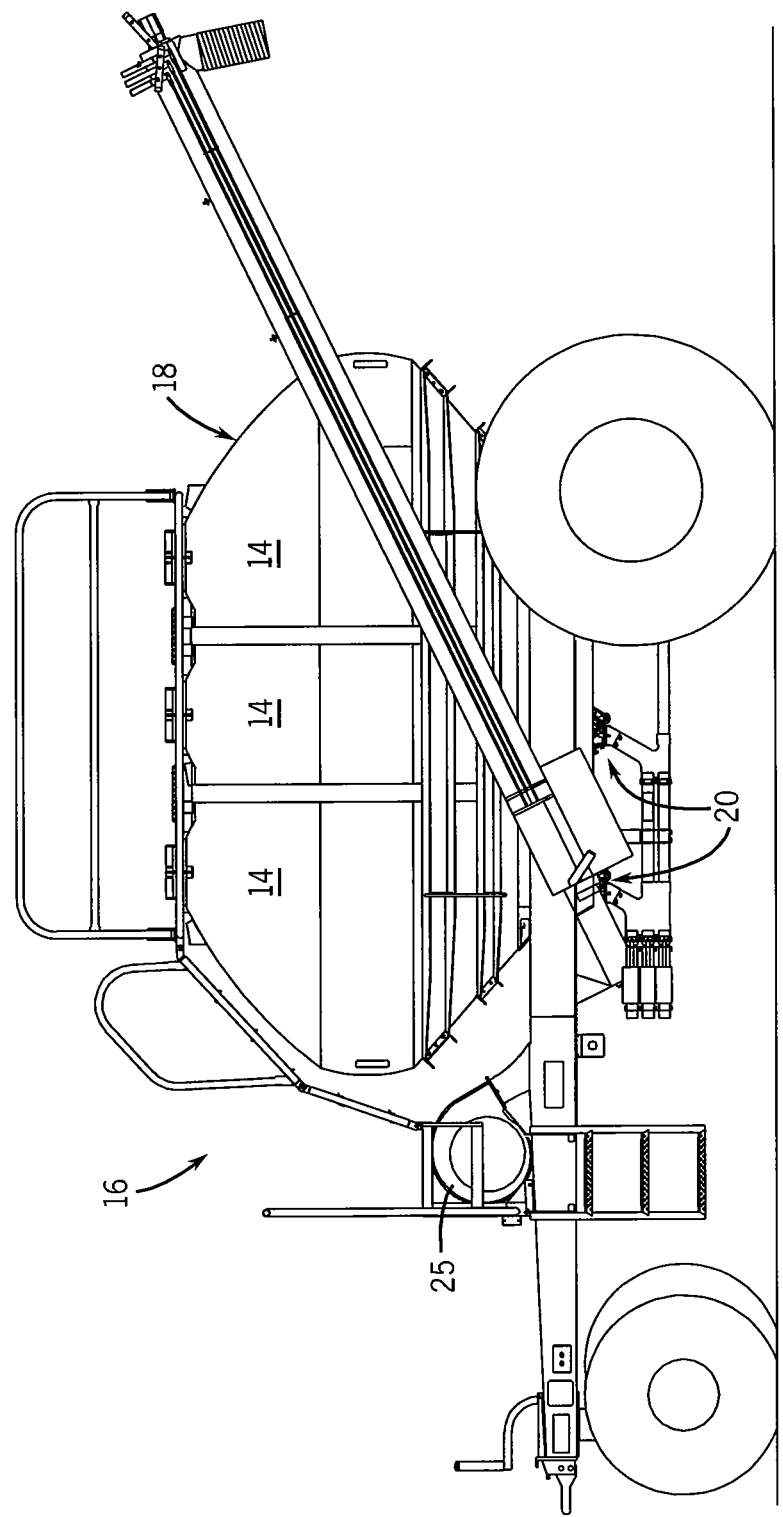
FIG. 2 is a side elevation view of the air cart of FIG. 1.

Turning now to FIGS. 1 and 2, an air seeder system 10 includes an air hoe drill 12 and an air cart 16 coupled to a towing tractor 13 in a conventional manner. As is known in the art, the air cart 16 has a large hopper 18 that holds a quantity of particulate matter, e.g., seed and/or fertilizer, and a metering unit 20 that meters the particulate matter from the hopper 18 to the air hoe drill 12. The hopper 18 includes multiple compartments 14, each of which may be configured to carry separate products, e.g., seed and/or fertilizer. The size of the hopper 18 and of the individual compartments 14 may vary according to various configuration of the air cart 16. One exemplary air cart is a Precision Air cart which is commercially available from CNH America, LLC.

Figure 3:
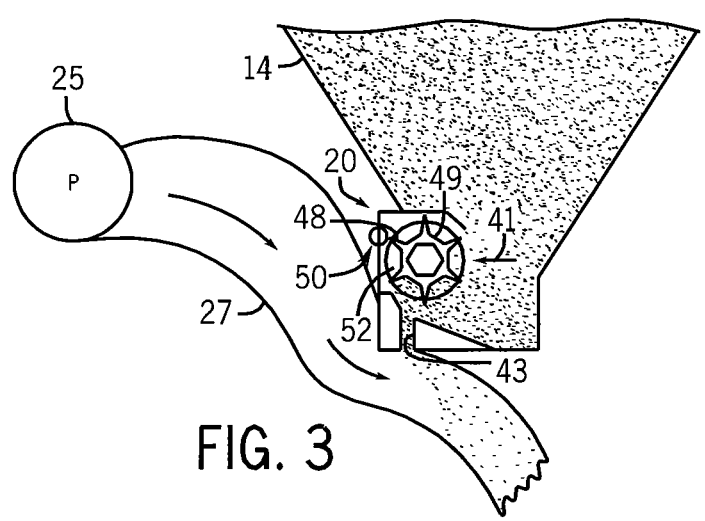
FIG. 3 is a block diagram representation of an exemplary metering unit used in the air cart of FIG. 1.

In addition to being mechanically linked with the air hoe drill 12, the air cart 16 and the air hoe drill 12 are interconnected by an air/product hose 22. Referring also to FIG. 3, air is supplied to the hose 22 by a blower assembly 25 generally mounted adjacent the front of the hopper 18 and adjacent the metering unit 20. Alternately, the blower assembly 25 may be mounted rearward of the hopper 18 or adjacent a side of the hopper 18. As known in the art, the blower assembly 25 creates a turbulent air flow that forces the particulate matter metered by the metering unit 20 into and along the air/product hose 22. The particulate matter is entrained in the air flow created by the blower assembly 25 and communicated from the air cart 16 through the product hose 22 to a header, or manifold, 26 that is mounted to and supported by the air hoe drill 12. In the illustrated embodiment, the header 26 is vertically oriented but it is understood that other orientations are possible. It is also contemplated that multiple headers 26 may be positioned along the air hoe drill 12. Each header 26 is then in fluid communication with a set of conduits, or hoses, 30 that deliver its portion of the air/product mixture to a row unit 38 which is configured in a conventional manner to deposit the particulate matter onto the seeding surface S.

The air cart 16 may include separate metering units 20 for each compartment 14 to allow individual control over the rate at which product is dispensed from the corresponding compartment 14. Referring next to FIG. 3, an exemplary embodiment of a metering unit 20 is illustrated. Each metering unit 20 includes an intake 41 in communication with the compartment 14 and an exit 43 in communication with a conduit 27 extending between the metering unit 20 and the product hose 22. A metering roller 48 includes multiple compartments 49 sized to control the volume of product transferred from the intake 41 to the exit 43. A primary driver 50 is mounted proximate to the metering unit 20 and engages a secondary driver 52 which rotates the metering roller 48. Optionally, the primary driver 50 may be configured to directly rotate the metering roller. It is contemplated that the primary driver 50 may be, for example, an electric motor or a hydraulic motor receiving a command to control the speed of rotation. The secondary driver 52 may be a gear, or gear train, operatively coupled between the primary driver 50 and the metering roller 48 as is known in the art. Optionally, the primary driver 50 may be a drive shaft which is, in turn, rotated by the wheels of the air cart 16. It is further contemplated that still other configurations of metering units 20 and compartments 14 may be utilized, such as one seed metering unit 20 configured to receive product from multiple compartments 14 or one primary driver 50 engaging multiple secondary drivers 52.

Figure 4:
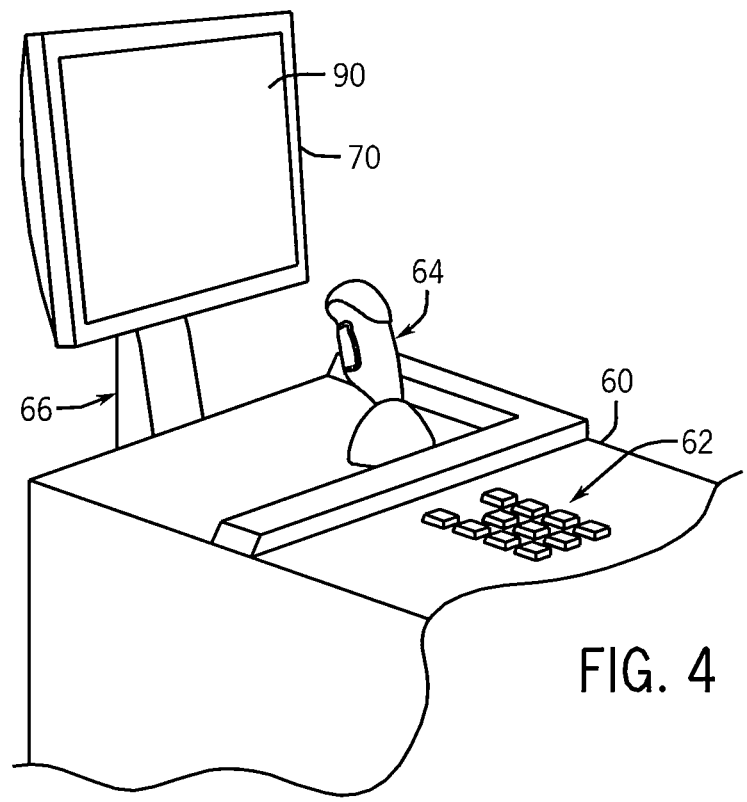
FIG. 4 is an exemplary environmental view of a tractor incorporating a controller configured to control operation of an air cart operatively connected to the tractor according to one embodiment of the invention.

Referring next to FIG. 4, the arm rest 60 of an exemplary tractor including a controller 70 incorporating the present invention is illustrated. The arm rest 60 includes various devices to receive input from the operator to control the tractor such as a panel of buttons 62 or a joystick 64. A mounting arm 66 is connected to the arm rest 60 and configured to hold the controller 70. Optionally, the controller 70 may be mounted to any suitable location within the tractor.

Figure 5:
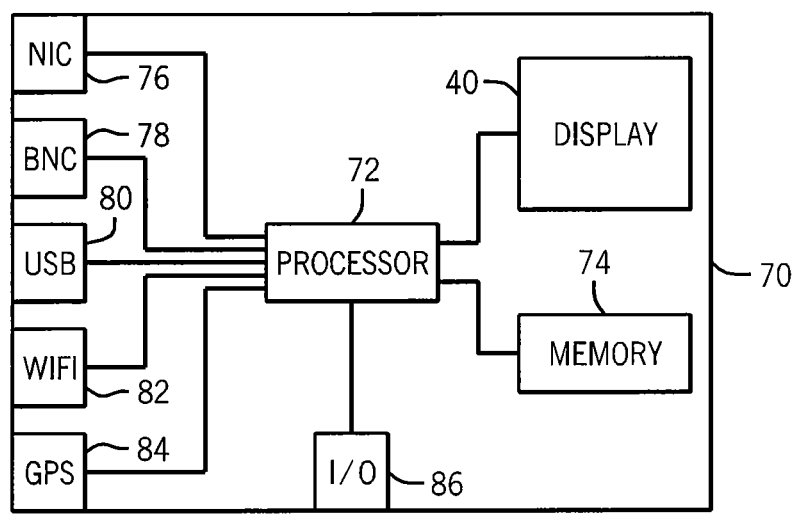
FIG. 5 is a block diagram representation of the controller of FIG. 4.

Referring next to FIG. 5, the controller 70 includes a processor 72 in communication with a memory device 74. It is contemplated that the processor 72 may be a single device or multiple devices operating in parallel or independently without deviating from the scope of the invention. Further, the processor 72 may a microprocessor, a field programmable gate array (FPGA), application specific integrated circuit (ASIC), discrete logic devices, or any combination thereof. It is further contemplated that the memory device 74 may be a single device or multiple devices, persistent or non-persistent memory, or any combination thereof. A series of instructions, or a program, may be stored in the memory device 74 and executed by the processor 72 to perform various functions of the controller 70 described herein. The controller 70 may include various combinations of ports with which the processor 72 is also in communication according to application requirements. As illustrated, the processor is in communication with a network interface card (NIC) 76, a Bayonet Neill-Concelman (BNC) connector 78 for coaxial cable, a Universal Serial Bus (USB) port 80, a wireless communication (WiFi) port 82, a global positioning system (GPS) antenna 84, and an input/output (I/O) port 86. The various ports provide interfaces between the processor 72 and local and/or remote resources including, but not limited to, the operator, attached agricultural implements, interface devices, radio and/or satellite communication devices. The processor 72 is further in communication with a display 90 to provide a visual indication of operating status and configuration to the operator. The display 90 may also be a touch screen device configured to receive input from the operator.

In operation, the controller 70 is configured to control distribution of product from each compartment 14 in the air cart 16, resulting in a custom blend of fertilizer being applied to the field. The operator enters the configuration of the air cart 16 into the controller 70. This configuration may be entered manually, for example, from a pull-down menu presented to the operator. Optionally, the air cart 16 may include an identifier and the controller is configured to automatically detect the identifier and determine the model of the air cart 16 connected to the tractor. A database stored in the memory device 74 may include additional configuration parameters such as the number of compartments 14 present on the air cart 16.

Figure 6:
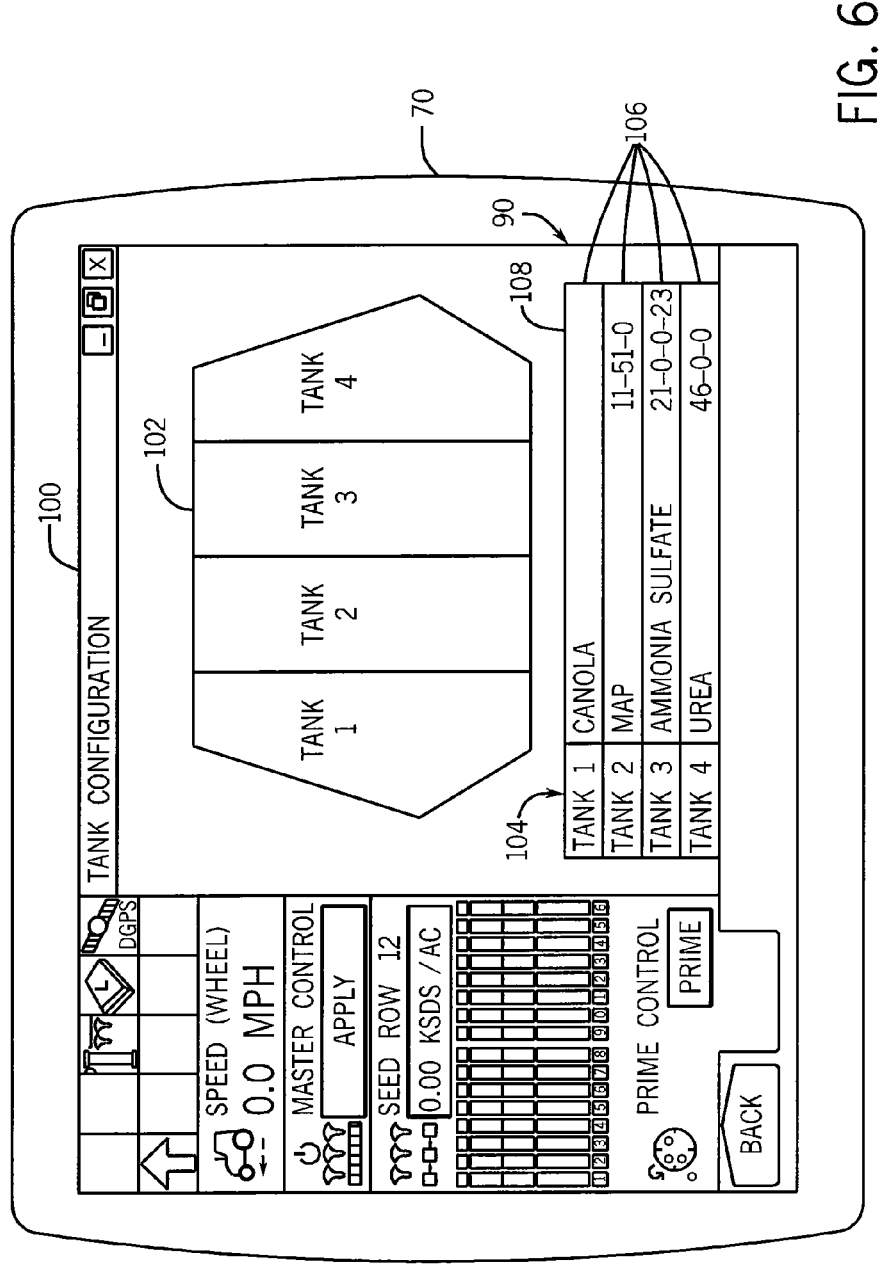
FIG. 6 is a front elevation view of the display of the controller of FIG. 4, illustrating a configuration screen for identifying the product in each compartment.

As shown in FIG. 6, the controller 70 presents a tank configuration screen 100 on the display 90 for the operator to identify the raw materials and/or seed loaded into each compartment 14. According to the illustrated embodiment of the invention, an image 102 of the air cart 16 and its respective compartments is displayed to the operator. A table 104 including a row 106 for each compartment 14 permits the operator to enter the product to be dispensed from the air cart 16. The product selection column 108 may include, for example, a drop down menu allowing the operator to select from a list of predefined seeds and/or raw materials. Optionally, a keypad may be attached to the controller 70 or presented on the display 90, if the display is configured as a touch screen, to receive a user input describing the product in the compartment 14.

Figure 7:
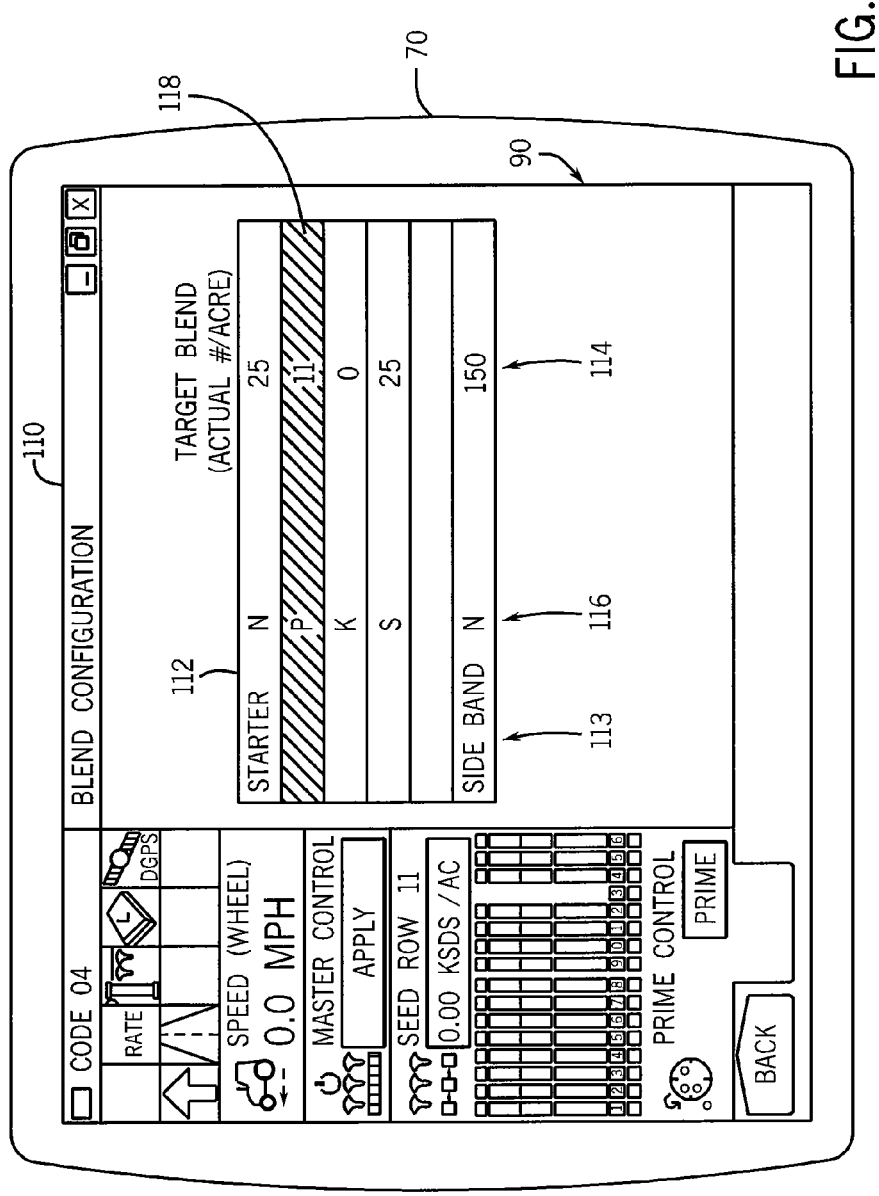
FIG. 7 is a front elevation view of the display of the controller of FIG. 4, illustrating a configuration screen for defining the desired rate of application of each product.

The controller 70 next presents a blend configuration screen 110 on the display 90, as shown in FIG. 7, for the operator to select a desired blend of fertilizer to be distributed to the field. According to the illustrated embodiment, a table of nutrients 112 is presented to the operator for which the operator may enter a desired application rate 114, for example, pounds per acre for each of the nutrients 116 identified. The table of nutrients 112 may be populated automatically as a function of the raw fertilizer components identified on the tank configuration screen 100. Optionally, the table of nutrients may be populated manually, for example, by the operator selecting the desired nutrients from a drop-down menu or by manually entering the nutrient.

The nutrients may include, but are not limited to, primary fertilizer elements, secondary fertilizer elements, or micronutrients. Primary fertilizer elements include nitrogen (N), phosphorous (P), and potassium (K) and the composition of these elements in fertilizer and/or the fertilizer components is commonly identified according to the (N—P—K) designations. Nitrogen is present, for example, in urea and ammonia nitrate. Phosphorous is present, for example, in mono-ammonium phosphate (MAP) and triple super-phosphate. Potassium is present, for example, in potassium nitrate, potassium sulfate, potassium chloride, or mono-potassium phosphate. Secondary elements include, for example, calcium (Ca), magnesium (Mg), and sulfur (S), where calcium is present in limestone or gypsum and sulfur is present in sphagnum peat moss. Micronutrients include, for example, boron (B), copper (Cu), iron (Fe), manganese (Mn), molybdenum (Mo), zinc (Zn). Therefore, by identifying the fertilizer component present in each compartment 14, the corresponding nutrient 116 may be presented on the table of nutrients 112.

Figure 8:
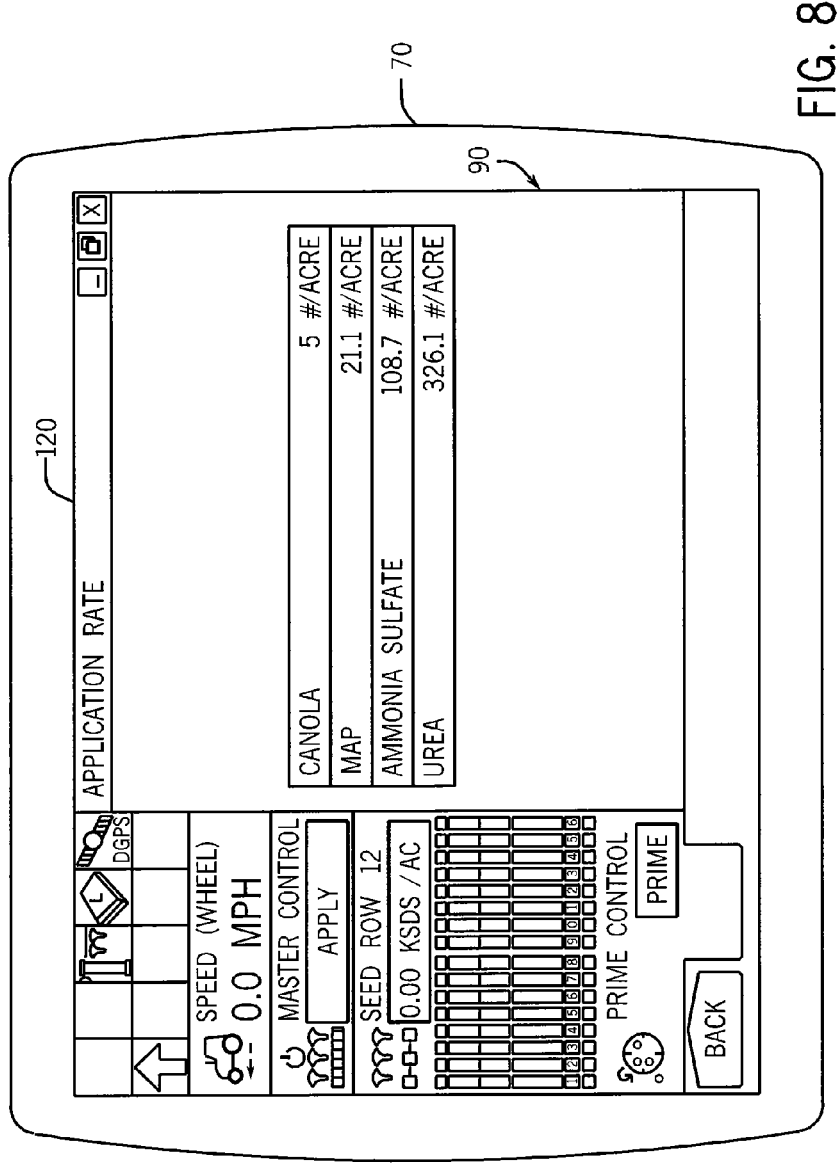
FIG. 8 is a front elevation view of the display of the controller of FIG. 4, illustrating a monitoring screen displaying the current rate of application of each product.

The controller 70 determines an application rate of each product as a function of the desired blend rate at which each nutrient is applied. As shown in FIG. 8, an application rate screen 120 is presented to the operator to display these resulting application rates. Further, the controller 70 provides a visual indicator 118 of the nutrient 116 that will be the first to empty. The visual indicator 118 may be, for example, highlighting the nutrient 116 or including a symbol or icon next to the nutrient 116. This visual indicator 118 may be presented on the application rate screen 120 or, optionally, on the blend configuration screen 110. Presenting the visual indicator 118 on the blend configuration screen 110 gives the operator the opportunity to adjust the desired blend, if possible, or to return to the tank configuration screen 100 and select a different configuration of compartments 14. For example, the operator may choose to put the fertilizer component that is likely to run out first in the largest compartment 14 or, if acceptable, to reduce the amount of the nutrient in the custom blend in order to increase the amount of time the air cart 16 may spend distributing product in the field prior to refilling. The illustrated embodiment presents one series of steps to prompt an operator for entry of a desired blend. It is contemplated that numerous other arrangements of charts, tables, and the like may be presented to the operator to accept entry of desired nutrients, desired blend, and/or desired application rates without deviating from the scope of the present invention.

The controller 70 may include additional features to increase planting and/or fertilizing efficiency. The air cart 16 and air hoe drill 12 may be configured to include a primary and a secondary run of air/product hoses 22 to provide multiple locations for delivery of product to the field. For example, a portion of the compartments 14 may be configured to meter product into the primary run to deliver seed and/or fertilizer into a row opened in the soil by the air hoe drill 12. In addition, one or more of the compartments 14 may be configured to meter product into the secondary run to deliver fertilizer, for example, in a side band between the rows opened in the soil or in a top band by delivering the fertilizer to the soil after the closers and packing wheel have placed the soil back over the planted seed. The blend configuration screen 110 may further include a run setting 113 corresponding to which of the primary or secondary runs a product is to be distributed. The run setting 113 may indicate, for example, primary or secondary. Optionally, as illustrated in FIG. 7 a starter blend of fertilizer may be defined that corresponds to one of the runs and a side band of fertilizer may be defined that corresponds to the other of the runs. The air cart 16 may further include run dividers that may be manually set or adjusted via an actuator to place each compartment 14 in fluid communication with either the primary or secondary run.

It is further contemplated that an operator may not require all of the compartments 14 in an air cart 16 to achieve a desired blend fertilizer. In this case, the operator may decide to add the same product presently contained within another of the compartments 14 to the empty compartment 14. For example, the operator may observe, according to the visual indication presented on the display 90, which of the products will empty first. The operator may then fill a second compartment 14 with the identified product. The controller 70, upon determining a desired distribution rate for the product, will subsequently determine a distribution rate for each compartment such that a portion of the product will be metered from each compartment and each compartment may be emptied at substantially the same time.

According to another aspect of the invention, the operator may wish to utilize varying blends of fertilizer within one field. The operator, for example, may be planting different crops in different sections of the field or may have identified varying nutrient deficiencies within different sections of the field. The controller 70 includes a map of the field which may be divided into multiple sections. On a field setup screen (not shown), the operator may associate a specific blend, for example, blend 1 or blend 2 with a corresponding section of the field. The blend configuration screen 110 may include a corresponding data entry field identifying which blend is being configured, and the controller 70 is configured to store multiple blends. Optionally, the field setup screen may include identifiers for different sections of the field and the blend configuration screen 110 may include a data entry field in which the operator enters the identifier for the section of the field in which the blend being configured is to be applied.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

I claim:

1. A method of distributing a custom blend of fertilizer to a field from an air cart using a controller in a tow vehicle, wherein the air cart has a plurality of compartments configured to hold a product for distribution to the field and wherein the controller includes a memory device, a display, and a user interface, the method comprising the steps of:

providing a first configuration screen on the display to prompt an operator to provide identification of the product contained in each of the plurality of compartments;

receiving from the operator identification of the product contained in each of the plurality of compartments via the user interface;

storing the identification of each product in the memory device;

providing a second configuration screen on the display to prompt the operator to identify amounts of each of the products to be applied to the field per unit of area, wherein the amounts of each of the products to be applied to the field per unit of area defines the custom blend of fertilizer;

receiving from the operator the amounts of each of the products to be applied to the field per unit of area via the user interface;

storing the amounts of each of the products to be applied to the field per unit of area in the memory device;

determining in the controller a rate of distribution of each product contained in one of the compartments as a function of the product identified in the compartment in response to the amounts of each of the products to be applied to the field per unit of area;

generating a signal output from the controller to a metering device for each of the compartments as a function of the rate of distribution of the corresponding product such that the metering devices distribute the custom blend of fertilizer to the field; and allowing the operator to selectively vary each of the amounts of each of the products to be applied to the field per unit of area to adjust the custom blend of fertilizer distributed to the field.

2. The method of claim 1 further comprising the step of providing on the display a visual indication to the operator of the rate of distribution of each of the products.

3. The method of claim 2 wherein a visual indication is provided on the display to the operator identifying which of the compartments will empty first as a function of the desired ratio of each of the products.

4. The method of claim 1 wherein the air cart further includes a primary run and a secondary run for delivery of product to the field and wherein the second configuration screen further prompts the operator to identify whether each of the products is applied via the primary run or the secondary run.

5. The method of claim 1 wherein the operator identifies the same product in at least two of the compartments on the first configuration screen and the rate of distribution of the product is determined as a function of each of the compartments in which it is contained.

6. The method of claim 1 wherein the step of providing a second configuration screen on the display to prompt the operator to identify the amounts of each of the products to be applied to the field per unit of area further prompts the operator to associate first amounts of products to a first portion of the field per unit of area and prompts the operator to associate second amounts of products to a second portion of the field per unit of area, and the step of receiving from the operator the amounts of each of the products to be applied to the field per unit of area includes receiving the first and second amounts, the first and second amounts corresponding to a different portion of the field.

7. A method of distributing a custom blend of fertilizer to a field from an air cart having a plurality of compartments, each compartment configured to hold a product for distribution to the field, the method comprising the steps of:
- storing a plurality of identifiers in a memory device of a controller configured to control operation of the air cart, each identifier corresponding to the product contained within one of the plurality of compartments;
- storing amounts of each of the products to be applied to the field per unit of area received from an operator via a user interface;
- storing a distribution rate for each of the products contained within the air cart in response to the amounts of each of the products to be applied to the field per unit of area received from the operator, wherein the distribution rates define the custom blend of fertilizer to be distributed; and
- controlling a metering unit operatively connected to each compartment to distribute the product from the compartment according to the stored distribution rate such that the metering devices distribute the custom blend of fertilizer to the field; and
- allowing the operator to selectively vary the amounts of each of the products to be applied to the field per unit of area to adjust the custom blend of fertilizer distributed to the field.

8. The method of claim 7 wherein at least two compartments are configured to hold the same product, further comprising the step of determining a unique distribution rate for each of the two compartments as a function of the distribution rate for the product, wherein the unique distribution rate for each of the compartments controls the metering unit operatively connected to the compartment.

9. The method of claim 7 further comprising the step of providing a visual indication to the operator corresponding to the compartment that will empty first as a function of the distribution rates stored for each product.

10. The method of claim 7 wherein the air cart includes a primary run and a secondary run for distributing the product in each of the compartments to the field and wherein after storing the distribution rate for each product the method further comprises the steps of:
- storing an indication of either the primary run or the secondary run for to be used by the compartment; and
- controlling an actuator operatively connected to each compartment to selectively connect either the primary run or the secondary run to the compartment.

11. The method of claim 7 wherein the step of storing the distribution rate for each of the products contained within the air cart includes storing a corresponding portion of a field to which the amounts of each of the products to be applied to the field per unit of area, and the step of controlling the metering unit is performed according to the stored distribution rate and according to the portion of the field.

12. A system for distributing a custom blend of fertilizer to a field, comprising:
- an air cart having:
- a plurality of compartments, wherein each compartment is configured to hold a product for distribution to the field, and
- a plurality of metering units, each metering unit operatively connected to at least one of the compartments to control the rate at which the product is distributed to the field; and
- a controller having:
- a memory device configured to store a plurality of instructions and a plurality of configuration parameters,
- a user interface configured to receive data from an operator for the configuration parameters,
- a display for providing a visual indication to a user of at least one of the configuration parameters and operation of the air cart,
- a plurality of output signals generated as a function of the configuration parameters, each output signal controlling operation of one of the metering units, and
- a processor configured to execute the stored instructions to:
- receive from the operator via the user interface identification of the product contained in each of the plurality of compartments and amounts of each product to be distributed to the field per unit of area,
- store the identification of the product and the amounts of each product in the configuration parameters,
- determine a rate of distribution of each product contained in one of the compartments as a function of the product identified in the compartment in response to the amounts of each of the products to be applied to the field per unit area,
- generate the output signals as a function of the identification of the product and the amounts of each of the products to be applied to the field per unit area in the configuration parameters such that the metering devices distribute the custom blend of fertilizer to the field; and
- allow the operator to selectively vary the amounts ratio of each of the products to be applied to the field per unit area to adjust the custom blend of fertilizer distributed to the field.

13. The system of claim 12 wherein the user interface is a touchscreen integrated with the display.

14. The system of claim 12 wherein a visual indicator is provided on the display corresponding to the first compartment in the air cart that will be empty as a function of the product it contains and the amounts of each of the products to be applied to the field per unit area of product distribution.

15. The system of claim 12 wherein at least two of the compartments hold the same product and the output signals are generated as a function of each of the compartments holding the same product.

16. The system of claim 12 wherein the air cart further includes a primary run and a secondary run for delivery of product to the field and wherein the second configuration screen further prompts the operator to identify whether each of the products is applied via the primary run or the secondary run.

17. The system of claim 12 wherein the amounts of each of the products to be applied to the field per unit area is selected from one of a plurality of amounts stored in the memory device.

18. The system of claim 12 wherein the processor is further configured to:
- receive from the operator via the user interface an identifier a plurality of amounts of each product to be distributed to the field per unit of area and an identifier associating each of the amounts to a portion of the field, and
- generate the output signals as a function of each desired ratio and the associated identifier.

* * * * *